2,767,181

METHOD OF PREPARING 2-AMINO-4-SUBSTITUTED PTERIDINES

Marvin J. Fahrenbach, Pearl River, N. Y., and Kenneth H. Collins, North Plainfield, N. J., assignors to American Cyanamid Company, New York, N. Y., a corporation of Maine No Drawing. Application October 27, 1954, Serial No. 465,154

8 Claims. (Cl. 260—251.5)

This invention relates to a new method for preparing pteridines. More particularly, it relates to a new process for the preparation of 2-amino-4-substituted pteridines.

In the past substituted pteridines have been prepared by reacting 5,6-diaminopyrimidines with 1,2-diketo compounds or with ethane or propane derivatives having substituents reactive with the aminopyrimidines to produce the pyrimido-pyrazine nucleus. In these condensations the substituent in the 4-position on the pyrimidine nucleus generally remained unchanged in the 4-position of the pteridine ring after the condensation.

We have now found that the substituent obtained in the 4-position on the pteridine nucleus when using our new intermediate 2,4,5-triaminodihydropyrimidine-6-sulfonic acid or a salt thereof can largely be controlled by the conditions present during the condensation to prepare the pteridine nucleus. The preparation of this new intermediate is described and claimed in copending application, Serial Number 465,128, filed October 27, 1954. When the triaminodihydropyrimidine sulfonic acid is reacted with a dicarbonyl compound in aqueous acid or alkali near neutrality a 2-amino-4-hydroxypteridine is obtained. However, when using dilute aqueous ammonia the corresponding 2,4-diaminopteridine is prepared. On the other hand, when the same intermediates are used and the reaction carried out in the presence of aqueous hydrogen sulfide, the corresponding 2-amino-4-mercaptopteridine is obtained. For example, Albert et al. J. Chem. Soc. 1951, page 482 prepared 4-hydroxypteridine, hydrolyzed it to 2-aminopyrazine-3-carboxyamide, then converted this compound to the thioamide which was finally treated with ethyl ortho-formate to yield 4-mercaptopteridine. As pointed out above, it has been very difficult heretofore to obtain pteridines having a mercapto group in the 4-position, by a simple condensation reaction.

The reaction to prepare the compounds of the present invention may be illustrated by the following equation:

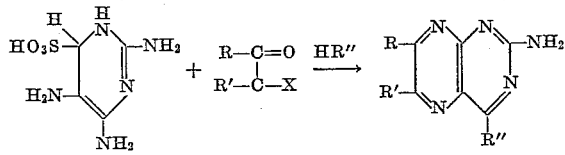

in which R is hydrogen, alkyl or a haloalkyl radical, R' is hydrogen, alkyl or an aminosubstitued alkyl radical, R" is an amino, hydroxyl or mercapto radical and X is oxygen or a dihalogen radical.

The reaction to form the compounds of the present invention will take place over a wide range of temperatures from room temperature to about 100° C. Temperatures of about 50°–75° C. are to be preferred.

The reaction is preferably carried out in a substantially aqueous medium although mixtures of water and water miscibel solvents in minor amounts such as alcohols, dioxane, etc. can be used.

The process of the present invention can be used to prepare folic acid and mercaptopteridines and other pteridines heretofore possible with difficulty from a single intermediate, triaminodihydropyrimidine sulfonic acid.

The following examples described in detail the preparation of substituted pteridines of the present invention.

EXAMPLE 1

Pteroylglutamic acid

A mixture of 2.06 parts of 2,4,5-triaminodihydropyrimidine-6-sulfonic acid, 2.66 parts of para-aminobenzoylglutamic acid, 200 parts of water and 4.43 parts of 1,1,3-tribromoacetone is heated at 70°–75° C., with vigorous stirring and dilute sodium hydroxide is added as needed to maintaiin pH 2–3. A product precipitates which contains pteroylglutamic acid.

EXAMPLE 2

2-amino-4-hydroxy pteridine

A solution of 75 parts of water and 18 parts of 5 N hydrochloric acid with 2.06 parts of 2,4,5-triaminodihydropyrimidine-6-sulfonic acid, at 80°–85° C., is treated with 5.68 parts of glyoxal bisulfite. After 20 minutes at 80°–85° C. ammonia is added until the mixture is faintly alkaline, and on cooling a solid precipitate appears. It is purified by repeated precipitations from dilute acid and from dilute ammonia to yield 0.79 part (43.6%) of 2-amino-4-hydroxypteridine monohydrate, which is identified by microchemical analysis for the elements and by comparison of its ultraviolet absorption spectra with that of an authentic sample.

EXAMPLE 3

2-amino-4-hydroxy-6,7-dimethylpteridine

In a similar experiment using 1.72 parts of diacetyl in place of glyoxal bisulfite, the yield of purified 2-amino-4-hydroxy-6,7-dimethylpteridine is 57%. It is identified by microchemical analysis and by comparison of its ultraviolet spectra with that of an authentic sample.

EXAMPLE 4

2,4-diamino-6,7-dimethylpteridine

A slurry of 2.06 parts of 2,4,5-triaminodihydropyrimidine-6-sulfonic acid in 50 parts of water is made alkaline to phenolphthalein test paper with ammonia. The temperature is raised to 70°–75° C. and 1.72 parts of diacetyl is added over a ten minute period. Heating is continued for 30 minutes at 70°–75° C., and additional ammonia was added to maintain a red spot on phenolphthalein test paper. On cooling to 10° C. the product precipitates and is filtered and washed. It is purified by precipitation from dilute hydrochloric acid with ammonia. The yield of 2,4-diamino-6,7-dimethylpteridine is 72.7%.

The properties of this product agree with those of a sample of the same material prepared from 2,4,5,6-tetraaminopyrimidine and diacetyl.

EXAMPLE 5

2-amino-4-mercapto-6,7-dimethylpteridine

Two parts of 2,4,5-triaminodihydropyrimidine-6-sulfonic acid is slurried in 75 parts of water at 30° C. and the solution is saturated with hydrogen sulfide. Then 1.7 parts of diacetyl is added and the temperature is raised to 85° C. while continuing to bubble hydrogen sulfide through the solution. After a short time a solid precipitates in crystalline form; heating at 80°–85° C. is continued one hour. Then 1.76 parts of diacetyl is added and with hydrogen sulfide passing through, the mixture is heated about one hour more at 85°–90° C. Sodium hydroxide is added to adjust the solution to about pH 11.0–11.5, and it is clarified. Acidification with dilute hydrochloric acid yields 2-amino-4-mercapto-6,7-dimethylpteridine, which is filtered, washed and dried. The yield is over 90% of the theoretical. It can be further purified by reprecipitation from dilute alkali with acid.

EXAMPLE 6

*2,4-diaminopteridine*

A solution of 4.12 parts of 2,4,5-triaminodihydropyrimidine-6-sulfonic acid in 22 parts of concentrated ammonium hydroxide and 50 parts of water at 75°–80° C. is prepared and 7.77 parts of glyoxal solution (commercial; about 30%) is added. A deep red color develops and yellowish-tan needles of 2,4-diaminopteridine begin to precipitate after heating the solution a few minutes. The temperature is maintained at 75°–80° C. for 30 minutes. After cooling to 5° C. the product is filtered and washed well with ice water. It is purified by crystallization from 250 parts of hot water (95°–100° C.). It is crystallized once more from 200 parts of water and dried at 50° C. It melts at 322°–325° C.

The ultraviolet absorption data agree with published values for this compound.

EXAMPLE 7

*2,4-diamino-6,7-dimethylpteridine*

A mixture of 2.0 parts of 2,4,5-triaminodihydropyrimidine-6-sulfonic acid and 50 parts of anhydrous pyridine is heated to 70°–75° C. and 1.7 parts of diacetyl is added over a ten minute period. The mixture is heated at 70°–75° C. for one hour then saturated with anhydrous ammonia and held at 70°–75° C. for an additional one and one-half hours. The crude product is isolated by filtration and purified by dissolving in dilute hydrochloric acid and precipitating with aqueous ammonia. The crystalline 2,4-diamino-6,7-dimethylpteridine is isolated by filtration at 10° C., washed with water and acetone and is dried in a vacuum desiccator over anhydrous calcium chloride.

We claim:

1. A method of preparing compounds having the formula

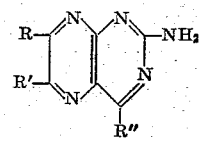

in which R is a member of the group consisting of hydrogen and lower alkyl radicals, R' is a member of the group consisting of hydrogen, lower alkyl, and amino-substituted lower alkyl radicals, and R" is a member of the group consisting of amino, hydroxyl, and mercapto radicals which comprises reacting a member of the group consisting of 2,4,5-triaminodihydropyrimidine-6-sulfonic acid and a salt thereof with a compound having the formula

in which R and R' are as defined above and X is a member of the group consisting of oxygen and dihalogen radicals in the presence of a member of the group consisting of a mineral acid, ammonium hydroxide, and hydrogen sulfide to produce compounds in which R" is a hydroxyl, amino, and mercapto radical, respectively, and recovering said compounds therefrom.

2. A method of preparing 2-amino-4-hydroxy-6,7-diloweralkyl pteridines which comprises reacting 2,4,5-triaminodihydropyrimidine-6-sulfonic acid with a bis(loweralkylcarbonyl) compound in the presence of hydrochloric acid and recovering said compound therefrom.

3. A method of preparing 2-amino-4-mercapto-6,7-diloweralkyl pteridines which comprises reacting 2,4,5-triaminodihydropyrimidine-6-sulfonic acid with a bis(loweralkylcarbonyl) compound in the presence of hydrogen sulfide and recovering said compound therefrom.

4. A method of preparing pteroylglutamic acid which comprises reacting 2,4,5-triaminodihydropyrimidine-6-sulfonic acid, 1,1,3-tribromacetone and para-aminobenzoylglutamic acid in the presence of dilute hydrobromic acid and recovering said product therefrom.

5. A method of preparing 2-amino-4-hydroxypteridine which comprises reacting 2,4,5-triaminodihydropyrimidine-6-sulfonic acid with glyoxal in the presence of dilute hydrochloric acid and recovering said compound therefrom.

6. A method of preparing 2-amino-4-mercapto-6,7-dimethylpteridine which comprises reacting 2,4,5-triaminodihydropyrimidine-6-sulfonic acid with diacetyl in the presence of hydrogen sulfide and recovering said compound therefrom.

7. A method of preparing 2-amino-4-hydroxy-6,7-dimethylpteridine which comprises reacting 2,4,5-triaminodihydropyrimidine-6-sulfonic acid and diacetyl in the presence of hydrochloric acid and recovering said compound therefrom.

8. A method of preparing 2,4-diamino-6,7-dimethylpteridine which comprises reacting ammonium 2,4,5-triaminodihydropyrimidine-6-sulfonate with diacetyl in the presence of ammonium hydroxide and recovering said compound therefrom.

No references cited.